US007420991B2

(12) United States Patent
Lok et al.

(10) Patent No.: US 7,420,991 B2
(45) Date of Patent: Sep. 2, 2008

(54) TCP TIME STAMP PROCESSING IN HARDWARE BASED TCP OFFLOAD

(75) Inventors: Ying P. Lok, Ladera Ranch, CA (US);
Ronald M. Mercer, Huntington Beach, CA (US); David C. Somayajulu, Laguna Niguel, CA (US); Shashank Pandhare, Aliso Viejo, CA (US); Michael I. Thompson, Colfax, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 784 days.

(21) Appl. No.: 11/097,024

(22) Filed: Apr. 1, 2005

(65) Prior Publication Data

US 2005/0180322 A1 Aug. 18, 2005

Related U.S. Application Data

(63) Continuation-in-part of application No. 10/620,076, filed on Jul. 15, 2003, now abandoned.

(51) Int. Cl.
*H04J 3/24* (2006.01)
(52) U.S. Cl. .................. 370/474; 370/395.4; 370/394
(58) Field of Classification Search ............. 370/474, 370/395.4, 394, 395.52
See application file for complete search history.

(56) References Cited

U.S. PATENT DOCUMENTS

| 5,937,169 | A | 8/1999 | Connery et al. |
|---|---|---|---|
| 6,246,683 | B1 | 6/2001 | Connery et al. |
| 6,247,060 | B1 | 6/2001 | Boucher et al. |
| 6,334,153 | B2 | 12/2001 | Boucher et al. |
| 6,389,479 | B1 | 5/2002 | Boucher et al. |
| 6,393,487 | B2 | 5/2002 | Boucher et al. |
| 6,427,171 | B1 | 7/2002 | Craft et al. |
| 6,427,173 | B1 | 7/2002 | Boucher et al. |
| 6,434,620 | B1 | 8/2002 | Boucher et al. |
| 6,470,173 | B1 | 10/2002 | Okada et al. |
| 6,470,415 | B1 | 10/2002 | Starr et al. |
| 6,483,840 | B1 | 11/2002 | Vogel |
| 6,591,302 | B2 | 7/2003 | Boucher et al. |
| 6,714,985 | B1 | 3/2004 | Malagrino et al. |
| 6,983,382 | B1 | 1/2006 | Hartke et al. |
| 7,050,437 | B2 | 5/2006 | Bilic et al. |
| 7,065,086 | B2 | 6/2006 | Basso et al. |

(Continued)

OTHER PUBLICATIONS

"Office Action from USPTO dated Dec. 28, 2007 for U.S. Appl. No. 10/619,719".

*Primary Examiner*—Ricky Ngo
*Assistant Examiner*—Kibrom T Hailu
(74) *Attorney, Agent, or Firm*—Klein, O'Neill & Singh, LLP

(57) ABSTRACT

A method for sending/receiving a TCP segment is provided. The sending process includes, determining if a TCP port can be offloaded; saving a host system's time stamp value; replacing a host system's time stamp value with a TCP offload engine ("TOE") adapter's time stamp value; and sending the TCP segment via the TOE adapter. The receiving process includes verifying if a TCP port is being offloaded by a host system to the TOE adpter; retrieving the host system's time stamp value; and inserting the host system's time stamp value in the received TCP segment before the forwarding the received TCP segment to the host system.

18 Claims, 9 Drawing Sheets

U.S. PATENT DOCUMENTS

| | | |
|---|---|---|
| 2002/0156908 A1 | 10/2002 | Basso et al. |
| 2003/0058880 A1 | 3/2003 | Sarkinen et al. |
| 2003/0108066 A1 | 6/2003 | Trippe |

| | Operation | Local Timestamp | Remote Timestamp | Notes |
|---|---|---|---|---|
| S300 — Client 100 | SYN | 00 00 A4 CB | 00 00 00 00 | Client uses software timestamp. |
| S301 — Server | SYN/ACK | 00 0F 98 6D | 00 00 A4 CB | |
| S302 — Client 100 | ACK | 00 00 A4 CB | 00 0F 98 6D | Client uses software timestamp. |
| S303 — Client 100 | Duplicate ACK | 00 00 66 29 | 00 0F 98 6D | Client uses TOE 101 timestamp and problem begins. (The duplicate ACK is used to open the TCP window.) This packet is dropped by server 103. |

FIGURE 3A(i)

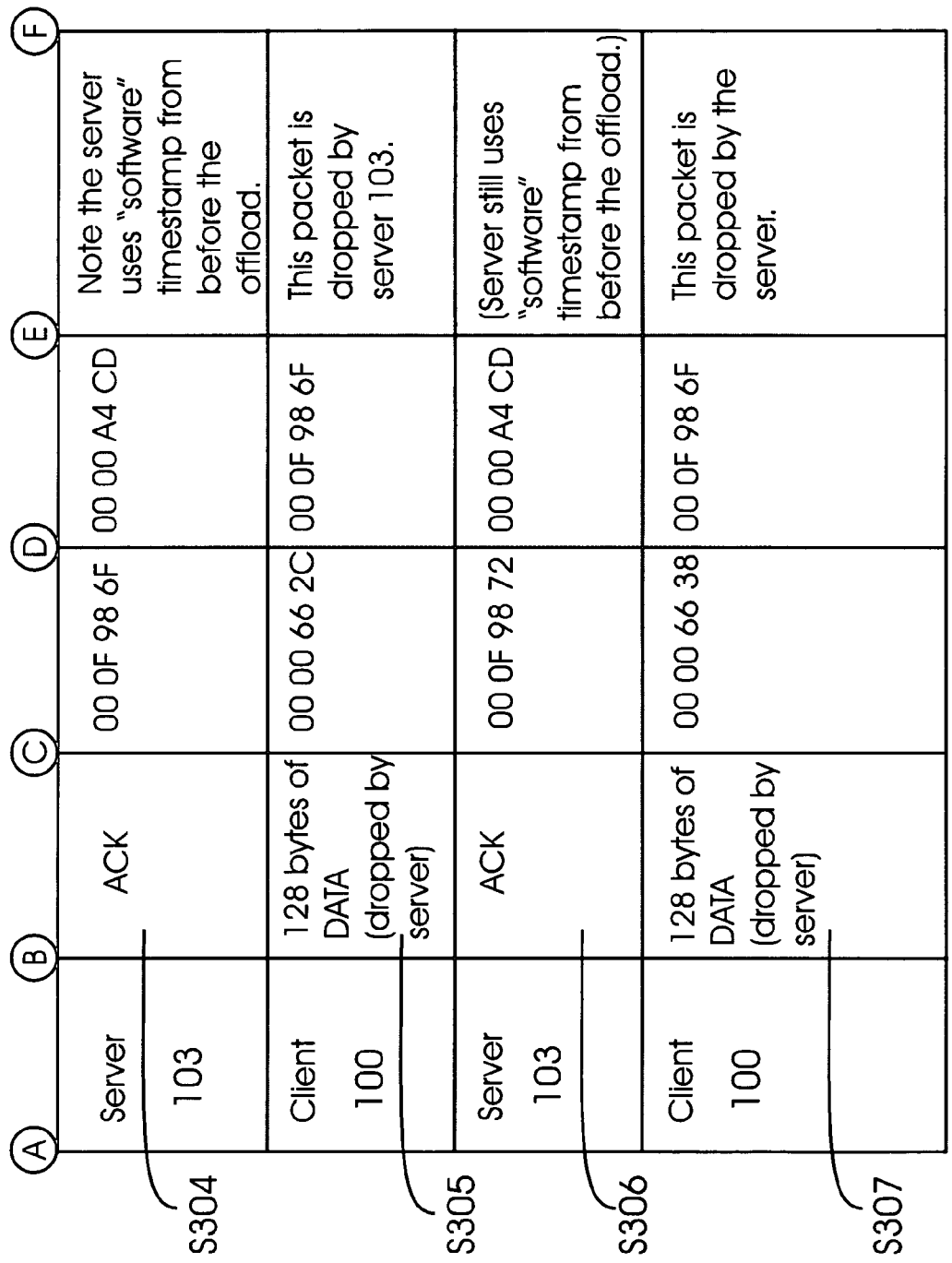
FIGURE 3A(ii)

TCP TIME STAMP PROCESSING IN HARDWARE BASED TCP OFFLOAD

CROSS REFERENCE TO RELATED APPLICATIONS

This application is a continuation-in-part of patent application Ser. No. 10/620,076 filed on Jul. 15, 2003, now abandoned the disclosure of which is incorporated herein by reference in their entirety.

BACKGROUND

1. Field of the Invention

The present invention relates to computer networks, and more particularly, to processing network data packets.

2. Background of the Invention

Conventional computer systems typically include several functional components. These components may include a central processing unit (CPU), main memory, input/output ("I/O") devices, and storage devices (for example, disk driver, tape drives) (referred to herein as "storage device").

In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Computer networking is common today. Network computing allows users to share information regardless of where they are located. Network computing has also increased the use of mass storage devices that can store data. Such storage devices often have to interface with networks to exchange commands and/or read and write data. Storage controllers are used to facilitate interaction between storage systems and computing systems.

Traditionally, storage controllers (e.g., disk array controllers, tape library controllers) have supported the SCSI-3 protocol and have been attached to computers by a Small Computer System Interface (SCSI) parallel bus or Fibre Channel. Internet SCSI (iSCSI) standard as defined by the Internet Engineering Task Force (IETF) maps the standard SCSI protocol on top of the TCP/IP protocol to overcome the physical limitations of SCSI.

Networks are generally defined as having layers of protocol. The iSCSI and TCP/IP protocol suite consist of four protocol layers; the application layer (of which iSCSI is one application), the transport layer (TCP), the network layer (IP) and the link layer (i.e. Ethernet).

TCP Overview

TCP is a network protocol that provides connection-oriented, reliable, byte stream service. Two network nodes establish a logical connection before sending data and TCP maintains state information regarding the data transfer. A byte stream service means that the TCP protocol views data to be sent as a continuous data stream. FIG. 1A shows a block diagram of TCP data encapsulated in an IP datagram. FIG. 1B shows a block diagram of a standard TCP header.

Each byte of data sent using a TCP connection is tagged with a sequence number. Each TCP segment header contains the sequence number of the first byte of data in the segment. This sequence number is incremented for each byte of data sent so that when the next segment is to be sent, the sequence number is again for the first byte of data for that segment. The sequence numbering is used to determine when data is lost during delivery and needs to be retransmitted.

A data packet receiver keeps track of the sequence numbers and knows the next sequence number when a new segment arrives. If the sequence number in the segment is not the expected one, the receiver knows that the segment has arrived out of order. This could be because the network reordered the segments or a segment was lost. Typically, TCP handles both of these cases.

Typically, when a TCP segment is received on a node, an acknowledgement ("ACK") packet is returned to acknowledge reception of the packet. To help reduce the number of segments on a network, TCP may delay the delivery of an ACK packet.

A TCP header can include various flag bits, for example, ACK flag denotes that the acknowledgement number is valid; SYN flag denotes synchronize sequence number to initiate a connection; FIN flag indicates that the packet sender has finished sending data; and RST flag resets a connection.

The standard TCP protocol provides a time stamp option where a sender of a packet places a time stamp. The time stamp is established during the initial phase of a TCP connection. The time stamp allows a receiver to avoid receiving old TCP segments and then considering them to be a part of an existing data segment.

Most conventional solutions for controlling communications between storage controllers and networks are via the software based Open Systems Interconnection (OSI) model. The iSCSI protocol with the TCP/IP protocol stack running in software requires a large amount of computing power, especially at current 1 giga bits per second (1 Gbps) and future 10 Gbps network link processing rates.

Hardware solutions, as disclosed in the co-pending patent application, Ser. No. 10/620,076 offload the TCP stack processing to a hardware/state machine based system (or TCP Offload Engine ("TOE") Adapter). However, the hardware solution has time stamp migration problems from a host's TCP/IP time stamp to the TOE adapter's time stamp during connection offload and upload, especially when the initial TCP connection is established by the host TCP/IP stack and then offloaded to the TOE adapter. The offloading in this context means that the TOE adapter processes the TCP/IP stack in hardware using state machines, instead of the software stack implementation in the host system. The host and the adapter time stamps vary and if the time stamp is not properly handled, a TCP packet is not processed.

Therefore, what is needed is a process and system that can handle the time stamp migration issues between a host system and a TOE adapter.

SUMMARY OF THE INVENTION

In one aspect, a method for sending a TCP segment is provided. The sending method includes, determining if a TCP port can be offloaded; saving a host system's time stamp value; replacing a host system's time stamp value with a TCP offload engine ("TOE") adapter's time stamp value; and sending the TCP segment via the TOE adapter.

In another aspect, a method for receiving a TCP segment is provided. The method includes, verifying if a TCP port is being offloaded by a host system to the TOE adpter; retrieving the host system's time stamp value; and inserting the host system's time stamp value in the received TCP segment before the forwarding the received TCP segment to the host system.

A system for exchanging TCP segments is provided. The system includes a server having an adapter for sending and receiving TCP segments; and a host system having a TCP offload ("TOE") adapter for processing a TCP/IP stack in hardware, wherein if a TCP port can be offloaded then the host system's time stamp value is saved and the host system's time stamp value is replaced with a TOE adapter's time stamp value before a TCP segment is sent via the TOE adapter.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIGS. 3A-3B show an example of how packets are dropped due to time stamp migration problems;

DETAILED DESCRIPTION OF THE PREFERRED EMBODIMENTS

To facilitate an understanding of the preferred embodiment, the general architecture and operation of a host system will be described. The specific architecture and operation of the preferred embodiment will then be described with reference to the general architecture.

Figure 1A:
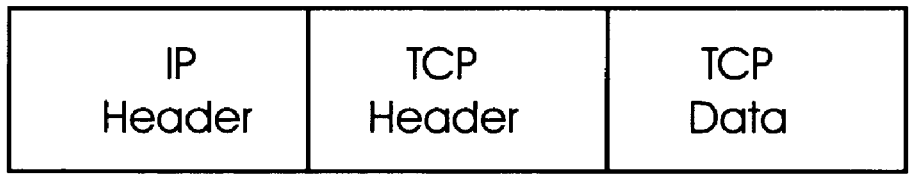
FIG. 1A shows an example of a TCP packet.
Figure 1B:
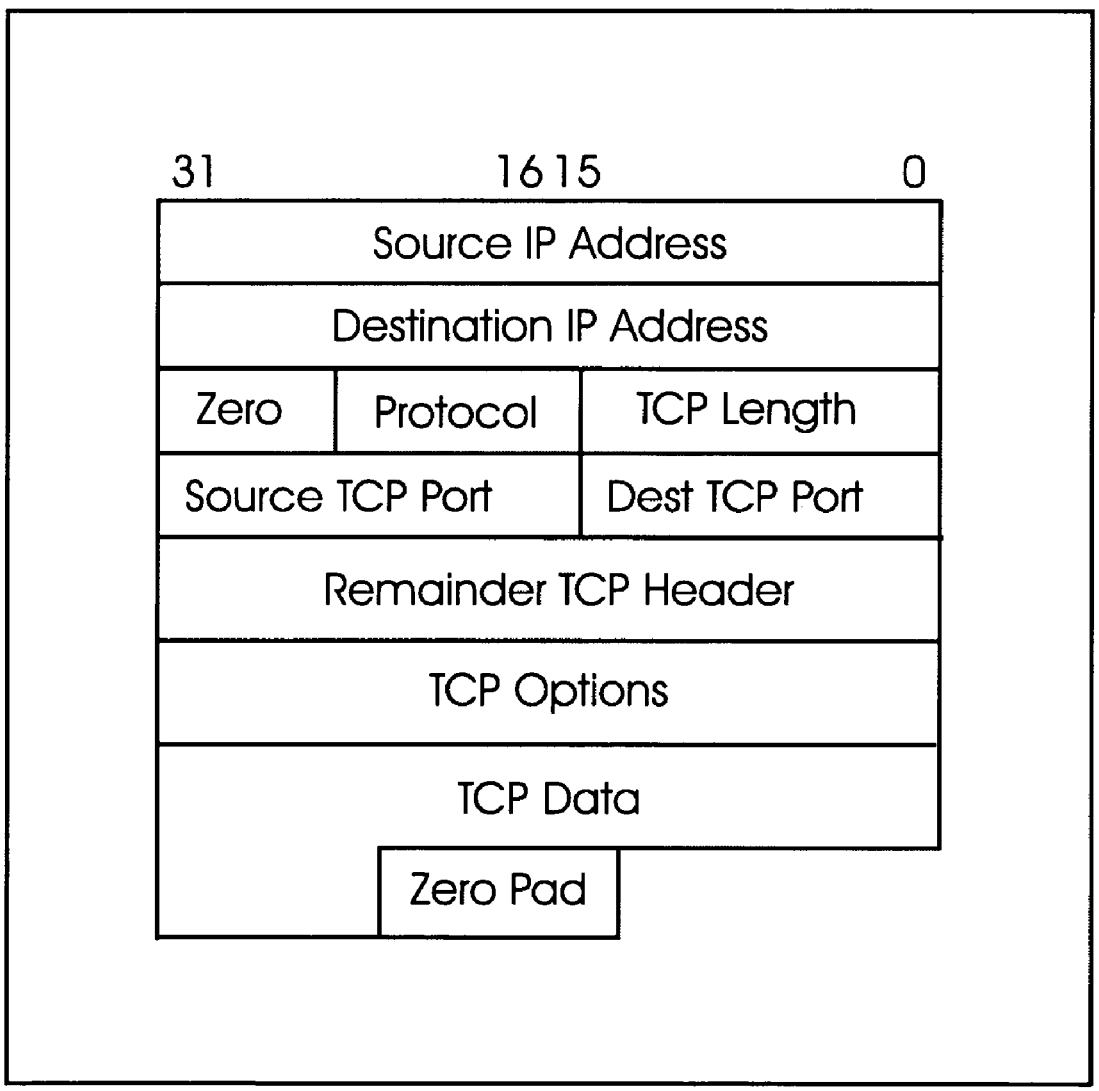
FIG. 1B shows an example of a standard TCP header.
Figure 1C:
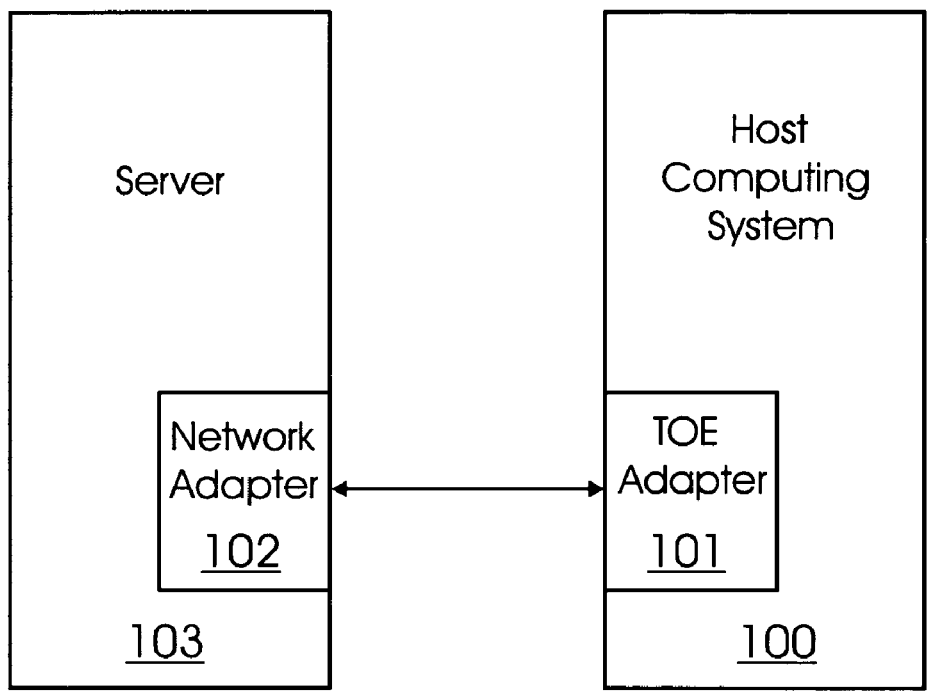
FIG. 1C shows a host system communicating with a server using a TOE adapter.

FIG. 1C shows an example of a host (also referred to as "client") computing system that can communicate with server 103. Host 100 uses adapter 101 to offload the processing of the TCP/IP stack. TOE adapter 101 uses various state machines to process a TCP segment in hardware, as described in the aforementioned pending patent application. Server 103 communicates with host 100 via adapter 102.

TOE adapter 101 includes a hardware implementation of a full network protocol stack. Application Programming Interfaces (APIs) to this protocol stack are made available to allow host software to take advantage of the hardware acceleration for straight network applications.

TOE adapter 101 may also be based on a PCI development board with a Field Programmable gate Array ("FPGA") or integrated into an Application Specific Integrated Circuit ("ASIC") with an embedded serialize/de-serializer ("SERDES") and internal programmable RAM.

Figure 1D:
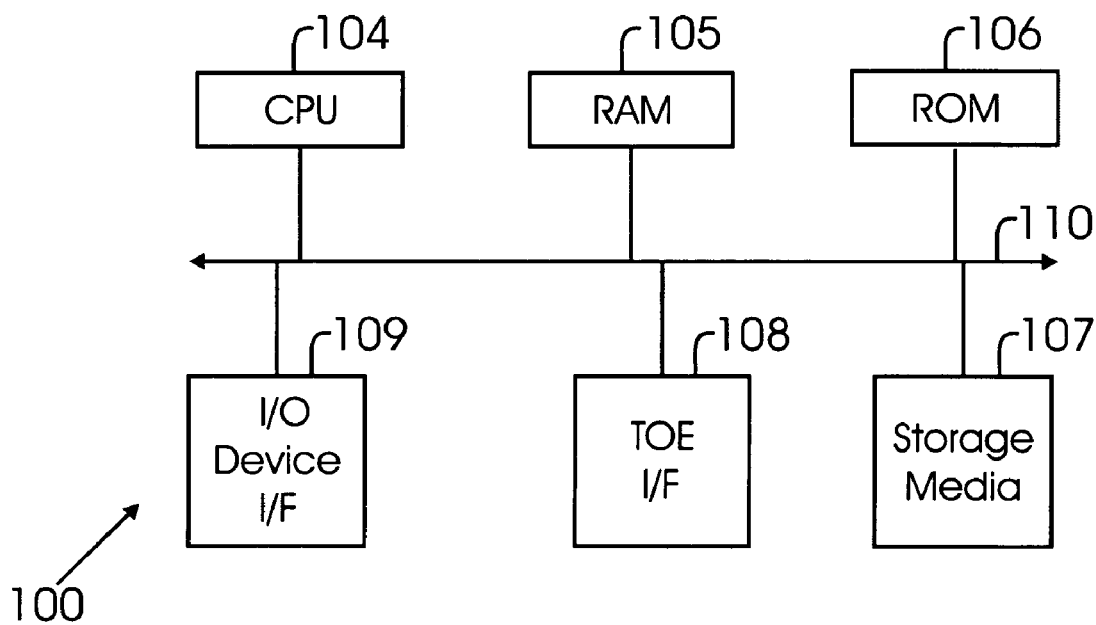
FIG. 1D shows an example of a computer system architecture.

FIG. 1D shows a block diagram of an architecture used by host system 100. It is noteworthy that the architecture shown in FIG. 1D is to illustrate one example of system architecture, other configurations may be used to implement the adaptive aspects of the present invention with fewer or more components.

Host 100 includes a central processing unit (CPU) 104 that is coupled to a system bus 110. CPU 104 may be an Intel® based microprocessor or any other type of processor and executes computer-executable process steps. Storage media 107 stores operating system program files, application program files, and other files. Some of these files are stored using an installation program. For example, CPU 104 executes computer-executable process steps of an installation program so that CPU 104 can properly execute the application program.

A random access main memory ("RAM") 105 also interfaces to computer bus 110 to provide CPU 104 with access to memory. When executing stored computer-executable process steps CPU 104 stores and executes the process steps out of RAM 105. Read only memory ("ROM") 106 is provided to store invariant instruction sequences such as start-up instruction sequences or basic input/output operating system (BIOS) sequences.

An I/O device(s) interface 109 allows host system 100 to use various input/output devices and peripherals. It is noteworthy that interface 109 may have plural components to interface with plural devices. TOE adapter interface 108 interfaces CPU 104 with TOE adapter 101.

Figure 2:
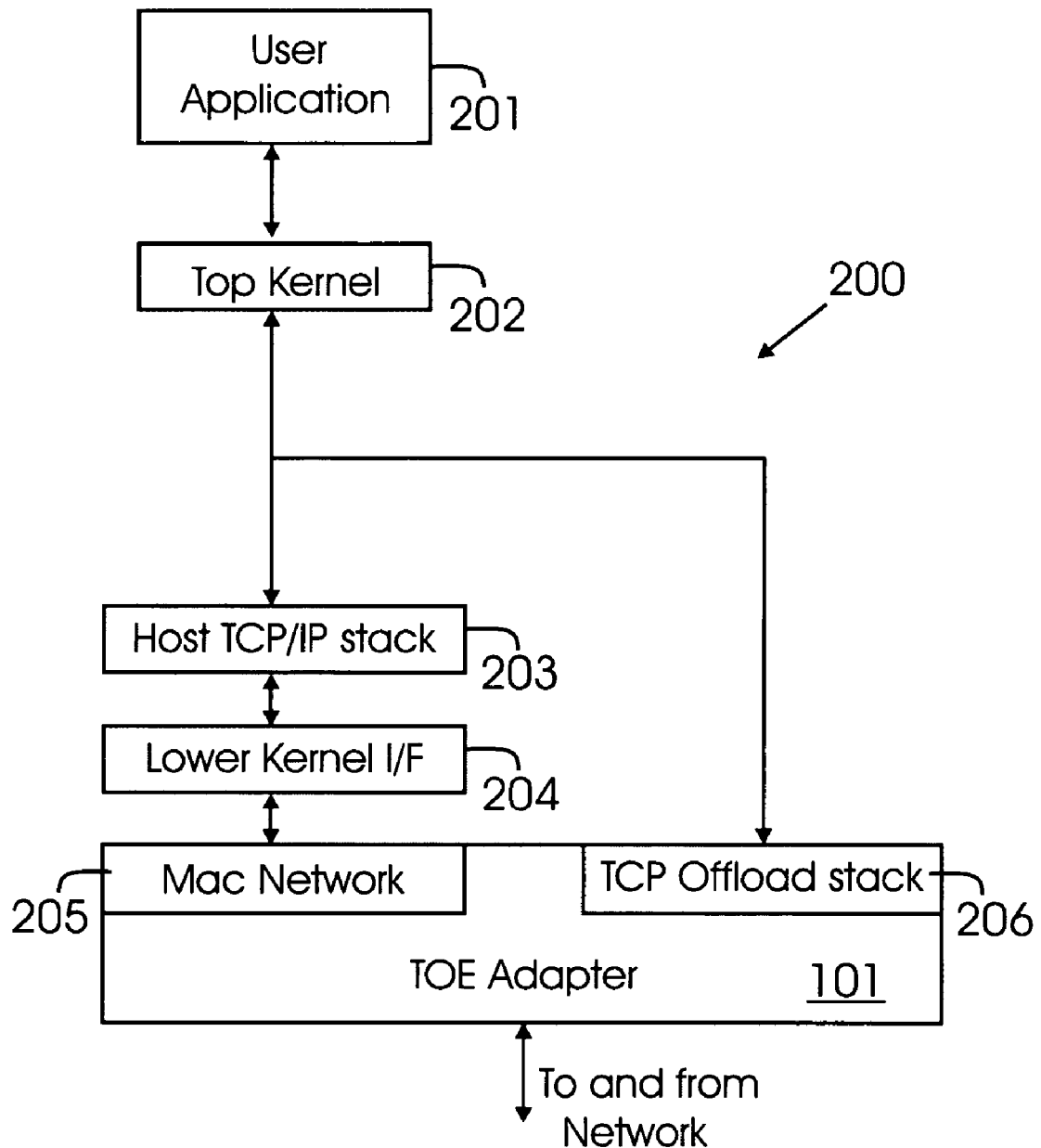
FIG. 2 shows an example of a computer system architecture with software modules, used by a host system.

FIG. 2 shows a block diagram of the overall system architecture 200 (with certain software/hardware modules) used by host system 100. System 200 may be used in the Windows® or Linux® environment. System 200 includes a user application 201 that allows a user to send network packets. System 202 includes a top operating system kernel 202 that interfaces with user application 201. If system 200 cannot offload the processing of TCP/IP stack, then the host TCP/IP stack processes TCP segments. Host TCP/IP stack 203 interfaces with adapter 101 via a lower kernel interface 204.

TOE Adapter 101 includes a TCP Offload stack 206 for processing TCP segments. The aforementioned patent application describes how TOE adapter 101 processes the TCP segments via hardware. MAC layer 205 interfaces with lower kernel interface 204 when host TCP/IP stack processes network packets.

Figure 3B:
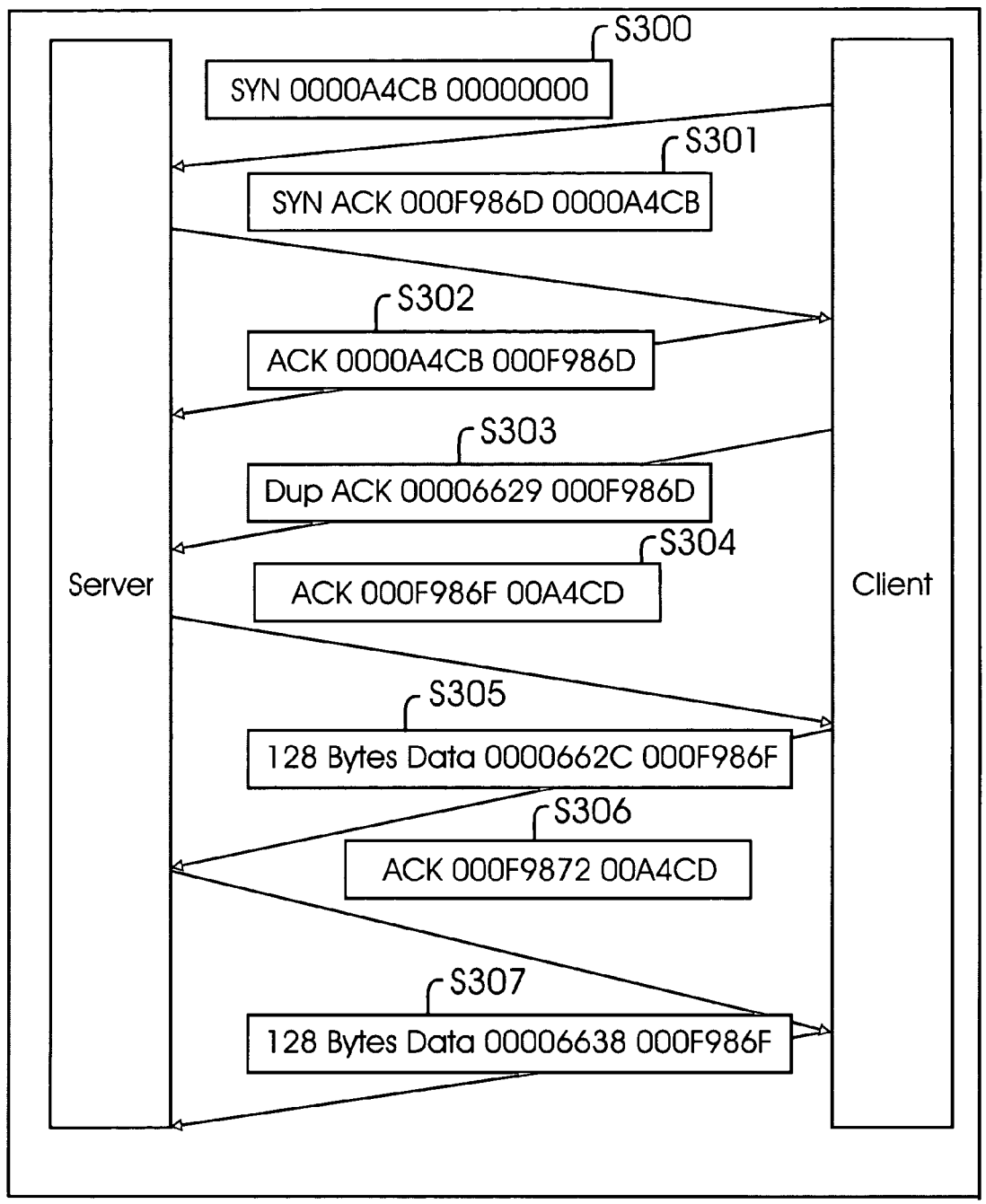

FIGS. 3A-3B show an example of how TCP packets are dropped due to time stamp variation between the host system 100 and TOE adapter 101. FIG. 3A provides a listing of the various operations, while FIG. 3B graphically illustrates the operations that are listed in FIG. 3A.

In step S300, host (referred to as client in the figures) 100 sends SYN packet with a host assigned time stamp. In step S301, server 103 sends SYN/ACK packet. In step S302, host 100 sends an ACK packet using a host 100 time stamp. In step S303, host 100 sends a duplicate ACK using TOE adapter 101 time stamp. The duplicate ACK is sent to open a TCP window. This occurs after the decision is made to offload the TCP/IP stack processing.

In step S304, in response to step S302, server 103 sends an ACK packet still using the host 100 time stamp. In step S305 host 100 sends 128 bytes of data using TOE adapter 101 time stamp. Server 103 drops this packet. In step S306, server 103 sends an ACK packet still using the host time stamp and in step S307, server 103 drops the packet that is sent from host 100.

Figure 4:
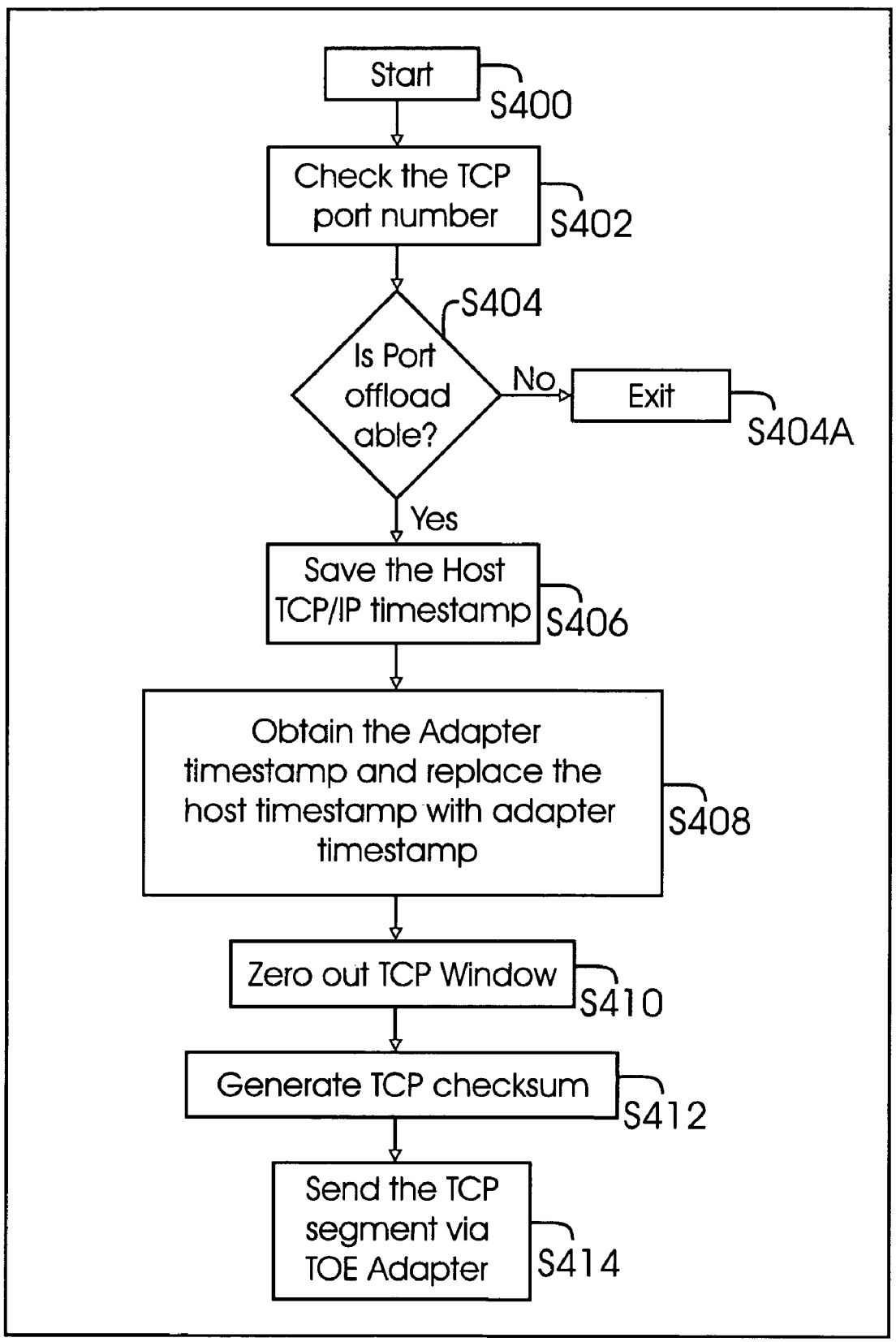
FIG. 4 shows a flow diagram for sending a SYN segment.

FIG. 4 shows a process flow diagram for a host system for sending a SYN segment. The process starts in step S400. In step S402, the TCP port number is checked. This is a standard operation before sending out a TCP segment. In step S404, the process checks if the TCP port can be offloaded, i.e., if TOE adapter 101 can process a TCP segment. If the answer is no, then the process ends in step S404A and the segment is handled just like any other TCP segment.

If the port can be offloaded in step S404, then in step S406, the host TCP/IP time stamp is stored. This stamp may be stored at any memory location that is accessible to CPU 104. In step S408, TOE adapter 101's time stamp is obtained from the TOE adapter 101 and host 100's time stamp is replaced by TOE adapter 101's time stamp.

In step S410, the TCP window is zeroed out, a checksum is generated in step S412 and the SYN segment is sent via TOE adapter 101 in step S414.

Figure 5:
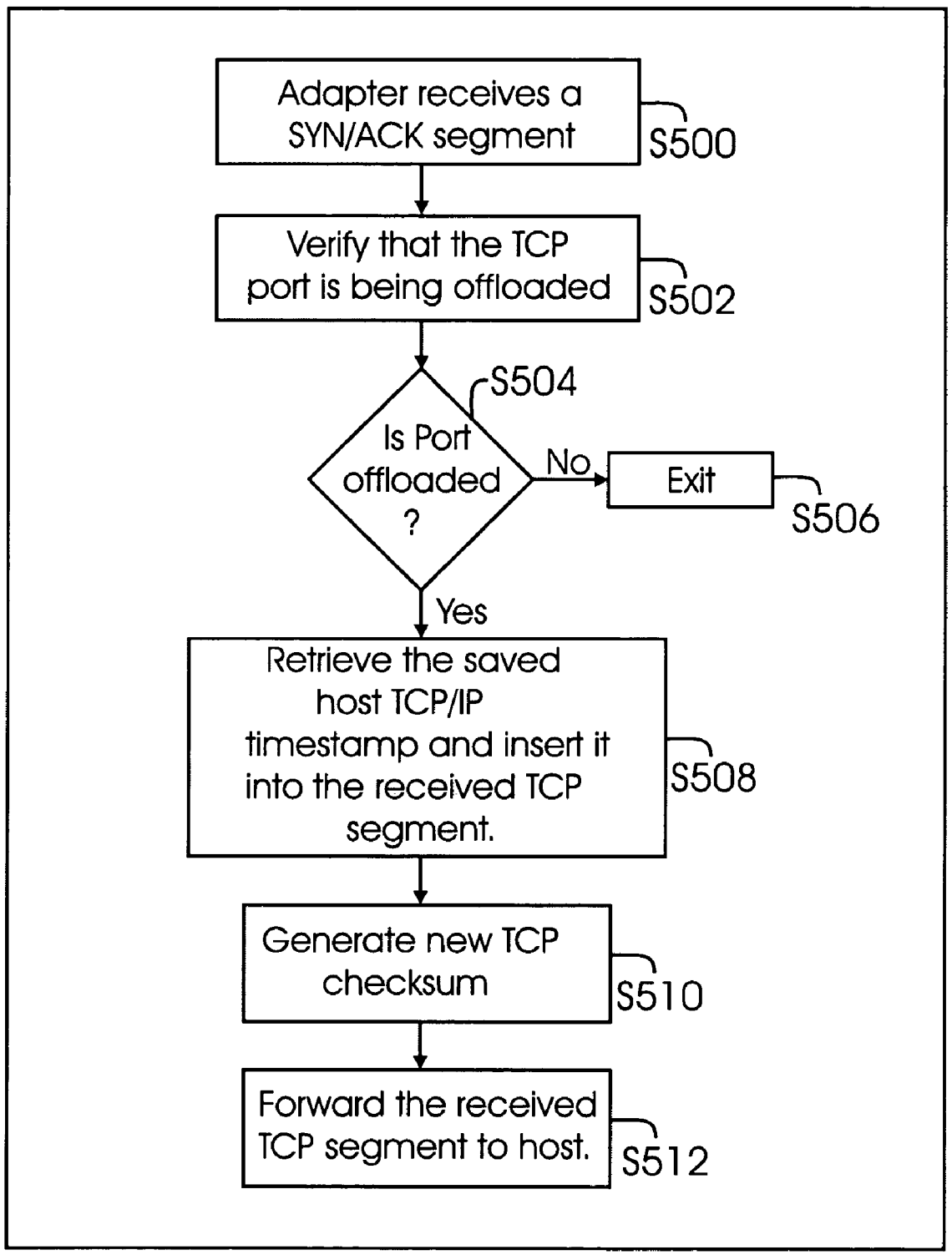
FIG. 5 shows a flow diagram for receiving a SYN/ACK segment.

FIG. 5 shows a process flow diagram for processing SYN/ACK segments received by TOE adapter 101, according to one adaptive aspect of the present invention. In step S500, TOE adapter 101 receives a SYN or ACK segment. In step S502, the process verifies if the TCP port receiving the SYN and/or ACK segment is being offloaded. In step S504, the process verifies if the port is offloaded. If the port is not offloaded, then the process is over in step S506 because the host TCP/IP stack handles the received segment. If the port is offloaded, then in step S508, TOE adapter 101 retrieves the host TCP/IP stamp and inserts it into the received TCP segment.

In step S510, a new TCP checksum is generated and the TCP segment is forwarded to the host. This allows the host 100 to process the TCP segment.

Figure 6:
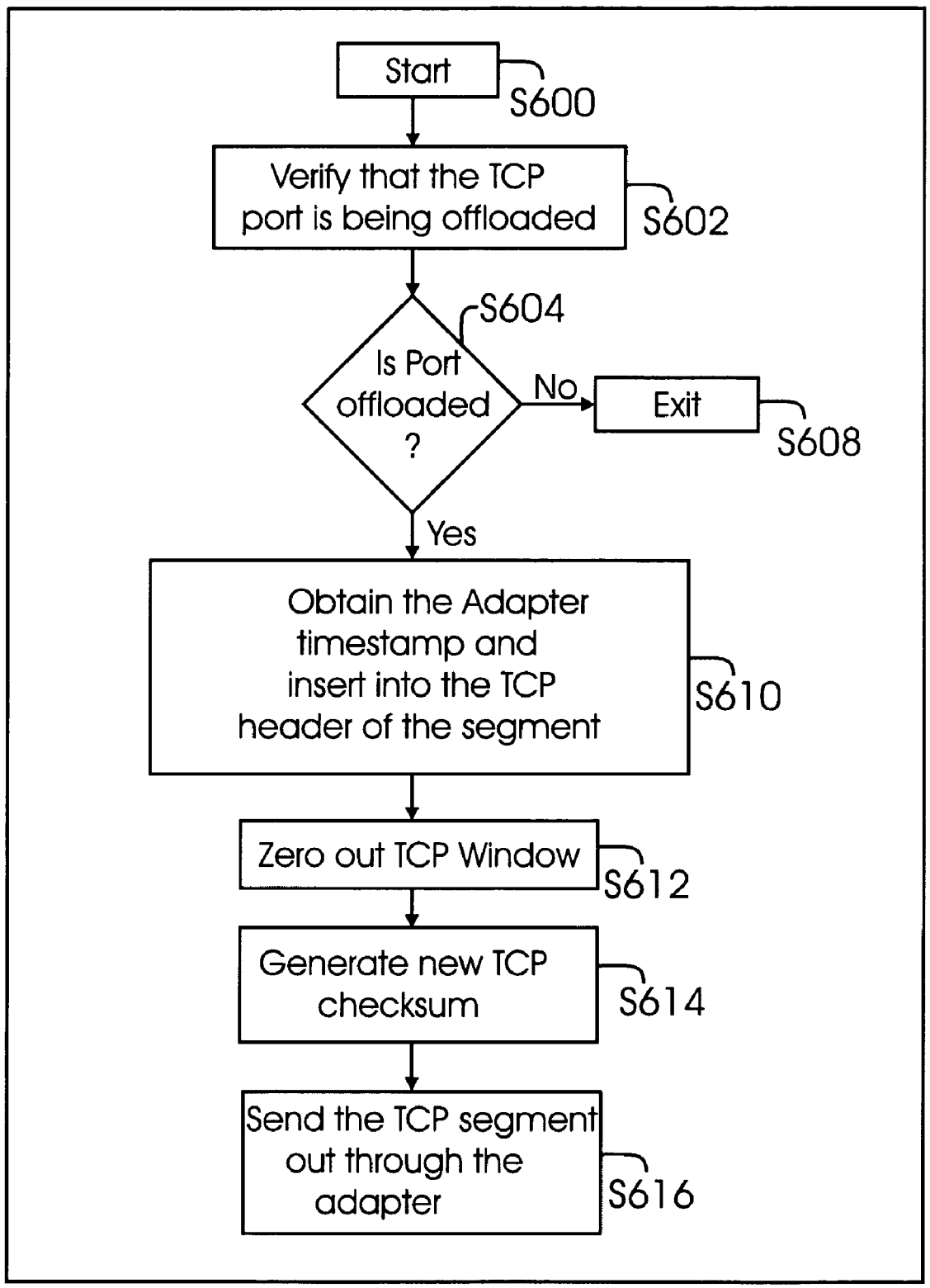
FIG. 6 shows a flow diagram for sending an ACK segment.

FIG. 6 shows a flow diagram where a host system 100 sends an ACK segment. The process start in step S600. In step S602, host 100 verifies if the TCP port is being offloaded. If not, then the process ends in step S608, because host 100 handles the ACK segment like any other ACK segment.

If the port is offloaded in step S604, then in step S610, host 100 inserts the TOE adapter 101's time stamp in the TCP header. The TCP window is zeroed out in step S612 and a new checksum is generated in step S614. The ACK segment is then sent out in step S616 via adapter 101. The TCP connection is then offloaded to TOE adapter 101.

In one aspect, time stamp differences between TOE adapter 101 and host 100 are efficiently managed to reduce the risk of packets being dropped.

Although the present invention has been described with reference to specific embodiments, these embodiments are illustrative only and not limiting. Many other applications and embodiments of the present invention is apparent in light of this disclosure.

What is claimed is:

1. A method for sending a TCP segment, comprising:
   determining if a TCP port can be offloaded;
   saving a host system's time stamp value;
   replacing a host system's time stamp value with a TCP offload engine (TOE") adapter's time stamp value; and
   sending the TCP segment via the TOE adapter.

2. The method of claim 1, wherein the host system obtains the TOE adapter time stamp value before replacing the host time stamp value.

3. The method of claim 1, wherein the host system time stamp value is different from the TOE adapter time stamp value.

4. The method of claim 1, wherein the TCP segment is a SYN segment.

5. The method of claim 1, wherein the TCP segment is an ACK segment.

6. A method for processing received TCP segments, by a TCP offload engine ("TOE") adapter, comprising:
   verifying if a TCP port is being offloaded by a host system to the TOE adapter;
   retrieving the host system's time stamp value; and
   inserting the host system's time stamp value in the received TCP segment before forwarding the received TCP segment to the host system.

7. The method of claim 6, wherein the received segment is a SYN segment.

8. The method of claim 6, wherein the received segment is an ACK segment.

9. The method of claim 6, wherein the host system time stamp value is different from the TOE adapter time stamp value.

10. A system for exchanging TCP segments, comprising:
    a server having an adapter for sending and receiving TCP segments; and
    a host system having a TCP offload ("TOE") adapter for processing a TCP/IP stack in hardware, wherein if a TCP port can be offloaded then the host system's time stamp value is saved and the host system's time stamp value is replaced with a TOE adapter's time stamp value before a TCP segment is sent via the TOE adapter.

11. The system of claim 10, wherein the host system obtains the TOE adapter time stamp value before replacing the host time stamp value.

12. The system of claim 10, wherein the host system time stamp value is different from the TOE adapter time stamp value.

13. The system of claim 10, wherein the TCP segment is a SYN segment.

14. The system of claim 10, wherein the TCP segment is an ACK segment.

15. A system for processing exchanging TCP segments, comprising:
    a server having an adapter for sending and receving TCP segments; and
    a host system having a TCP offload ("TOE") adapter for processing a TCP/IP stack in hardware, wherein after verifying if a TCP port is being offloaded by the host system to the TOE adapter; the host system's time stamp value is retrieved; and the host system's time stamp value is inserted in the received TCP segment before forwarding the received TCP segment to the host system.

16. The system of claim 15, wherein the received segment is a SYN segment.

17. The system of claim 15, wherein the received segment is an ACK segment.

18. The system of claim 15, wherein the host system time stamp value is different from the TOE adapter time stamp value.

* * * * *

UNITED STATES PATENT AND TRADEMARK OFFICE
CERTIFICATE OF CORRECTION

PATENT NO. : 7,420,991 B2                                              Page 1 of 1
APPLICATION NO. : 11/097024
DATED : September 2, 2008
INVENTOR(S) : Ying P. Lok et al.

It is certified that error appears in the above-identified patent and that said Letters Patent is hereby corrected as shown below:

On the Title page, in Item (54), in column 1, in Title, line 2, after "OFFLOAD" insert -- ADAPTER --.

In column 1, line 2, after "OFFLOAD" insert -- ADAPTER --.

Signed and Sealed this

Nineteenth Day of October, 2010

David J. Kappos
*Director of the United States Patent and Trademark Office*